United States Patent [19]

Hsu

[11] 4,430,931

[45] Feb. 14, 1984

[54] VEGETABLE PEELING DEVICE

[75] Inventor: Wei K. Hsu, Elmhurst, N.Y.

[73] Assignee: Promar, Inc., Jersey City, N.J.

[21] Appl. No.: 404,555

[22] Filed: Sep. 2, 1982

Related U.S. Application Data

[63] Continuation of Ser. No. 170,620, Jul. 21, 1980, abandoned.

[51] Int. Cl.³ ............................ A23N 7/00; A23N 7/10
[52] U.S. Cl. ........................................ 99/589; 99/591
[58] Field of Search .................. 99/541, 584, 588–591, 99/623, 643; 83/368

[56] References Cited

U.S. PATENT DOCUMENTS

| | | | |
|---|---|---|---|
| 1,988,098 | 1/1935 | Weibel | 99/591 |
| 2,699,806 | 1/1955 | Gardner | 99/576 |
| 3,040,654 | 6/1962 | Opie | 99/349 |
| 4,212,237 | 7/1980 | Hsu | 99/589 |

Primary Examiner—Timothy F. Simone
Attorney, Agent, or Firm—Auslander & Thomas

[57] ABSTRACT

A vegetable peeling device for carrots, squash, turnips and the like employs a plurality of parallel pairs of cutting blades spring loaded toward each other. The pairs of blades are stacked about a common center and they are arranged at equal angular intervals around the common center. A vegetable pushed between the stacked pairs of blades has pairs of strips of skin peeled therefrom as it passes each of the pairs of blades and emerges fully peeled.

11 Claims, 2 Drawing Figures

VEGETABLE PEELING DEVICE

This is a continuation of application Ser. No. 170,620 filed July 12, 1980 abandoned.

BACKGROUND OF THE INVENTION

The present invention relates to apparatus for peeling vegetables and more particularly to apparatus for slicing peel from vegetables using a cutting knife.

Industrial apparatus for peeling vegetables commonly employs abrasive or chemical means. The abrasive means can include abrasive rotating discs or drums which abrade the surface to remove the vegetable peel. The chemical means include immersion of the vegetable in a caustic liquid which dissolves the outer layer including the peel. The caustic liquid and dissolved vegetable are washed away with water.

For certain users, it is desirable to produce a peeled vegetable having a smooth shiny outer surface such as is produced by manual peeling with a knife. This is especially true in the preparation of carrot sticks for sale and consumption in fresh uncooked form. Unfortunately, both of the above-mentioned industrial peeling methods leave a dull looking and/or abraded outer surface.

OBJECTS AND SUMMARY OF THE INVENTION

It is an object of the present invention to provide a vegetable peeling apparatus which overcomes the drawbacks of prior devices.

It is a further object of the invention to provide an industrial vegetable peeling apparatus which removes the vegetable peel with cutting knives.

According to an aspect of the invention, there is provided a vegetable peeling apparatus comprising at least first and second pairs of parallel knife members and means fur urging the knife members of each pair toward each other. Means are also provided for forcing a vegetable to be peeled successively between each of the pairs of parallel knife members. The pairs of parallel knife members have means responsive to the forcing of the vegetable between them for moving the parallel knife members apart to accommodate the vegetable therebetween. Each knife member includes means for slicing a strip of peel from the vegetable as it is forced therebetween whereby first and second strips of peel are sliced from opposed sides of the vegetable. The pairs of prallel knife members are angularly offset from each other so that each pair of knife members slices first and second strip of peel from different surface portions of the vegetable.

The above, and other objects, features and advantages of the present invention will become apparent from the following description read in conjunction with the accompanying drawings in which like reference numerals designate the same elements.

DETAILED DESCRIPTION OF THE PREFERRED EMBODIMENT

Figures 1, 2:
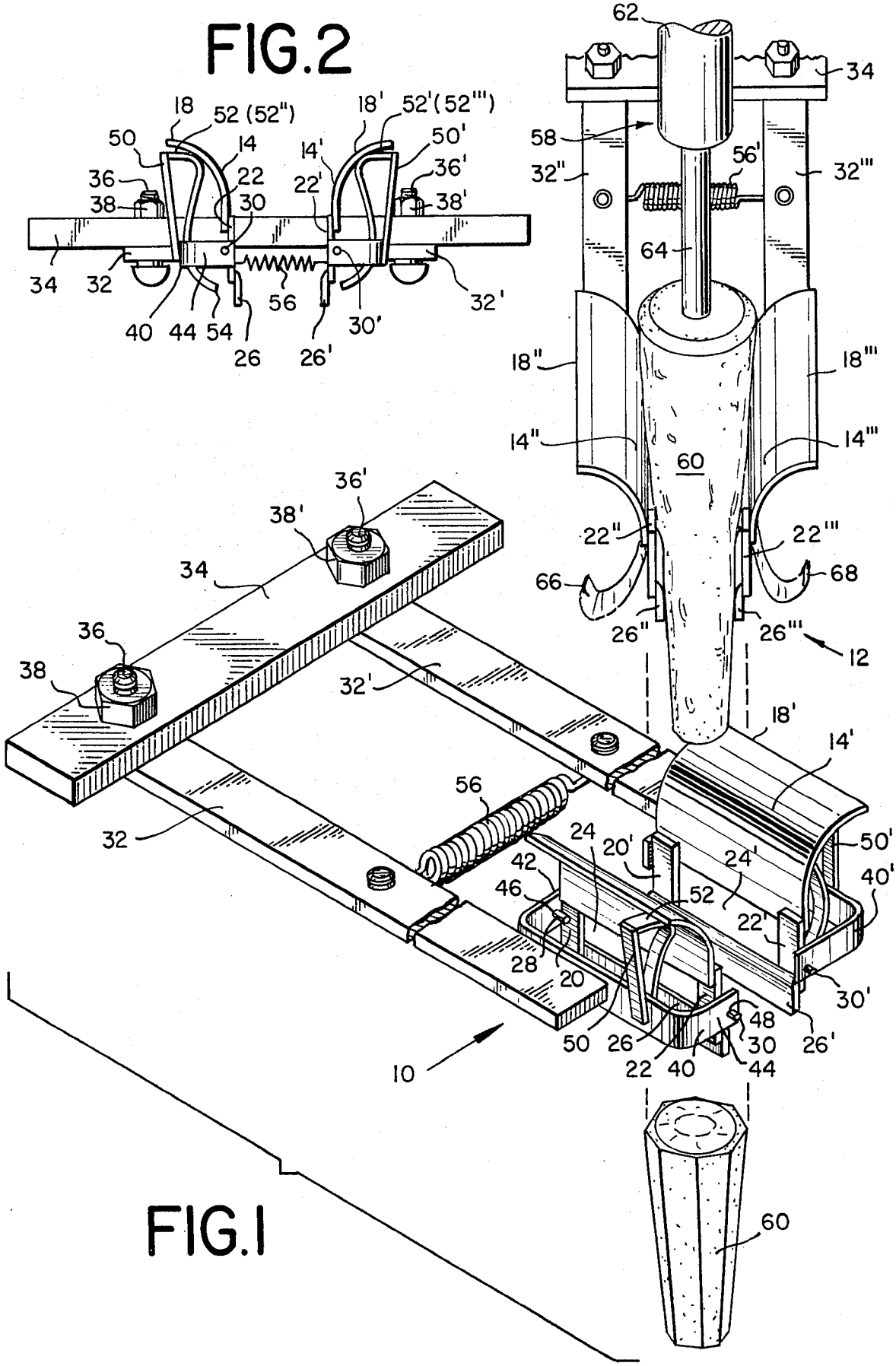
FIG. 1 shows a simplified perspective view of an embodiment of the invention from which certain elements are omitted for clarity of presentation.
FIG. 2 shows an end view of one of the cutting knife assemblies of FIG. 1.

Referring now to FIG. 1, parts of a peeling apparatus are shown with other parts ommitted for clarity of presentation.

A plurality, preferably four, pairs of cutting knife assemblies, represented by two cutting knife assemblies 10 and 12, in FIG. 1 are stacked for sequential operation on a vegetable or other item to be peeled. Each of the four cutting knife assemblies is identical to cutting knife assembly 10 except for its position in the stack and its angular orientation, and therefore only cutting knife assembly 10 is described in detail.

Cutting knife assembly 10 includes a first knife member 14 opposed to a second knife member 14'. First knife member 14 has an outwardly flaring guide plate 18 to provide an entry portion. A pair of support bars 20 and 22 extend downward near the ends of guide plate 18 leaving a space 24 therebetween. A knife bar 26 is supported near the ends of support bars 20 and 22. A pair of pivot pins 28 and 30 are welded or otherwise affixed to support bars 20 and 22 respectively.

A pivoted arm 32 is pivoted to a machine frame, represented in FIG. 1 by a bar 34 by any convenient means such as by a bolt 36 and a nut 38. A U-shaped saddle 40 is rigidly affixed to the outboard end of pivoted arm 32. Arms 42 and 44 of U-shaped saddle 40 include pivot holes 46 and 48 therein through which pivot pins 28 and 30 are passed. It should be clear that first knife member 14 is pivotable about an axis defined by pivot pins 28 and 30.

Referring now also to the end view of cutting knife assembly 10, in FIG. 2, a stop member 50 is rigidly affixed to U-shaped saddle 40 outside the central area in which cutting normally takes place. Stop member 50 has an upper abutment 52 which is effective to contact the inner surface of guide plate 18 to limit the couterclockwise rotation of first knife member 14 in FIG. 2. Stop member 50 also has a lower abutment 54 which is effective to contact knife bar 26 to limit the clockwise rotation of knife member 14 in FIG. 2. The total angular freedom of first knife member 14 is preferably between about 15 and 25 degrees and is most preferably about 20 degrees.

Second knife member 14' is an identical mirror image of first knife member 14. Thus, elements of second knife member 14' are identified by primed reference numbers and will not be further described.

A resilient member of any convenient type such as a coil spring 56 urges pivoted arms 32 and 32' and knife members 14 and 14' toward each other.

Instead of being pivoted to bar 34 at separate bolts 36 and 36', pivoted arms 32 and 32' may be curved or bent in a fashion well known in the art and not shown to permit pivoting, both of pivoted arms 32 and 32' on a single pivot. Furthermore, it would be clear to one skilled in the art that, as pivoted arms 32 and 32' are moved apart, knife bars 26 and 26' develop a skew angle between them rather than remaining parallel. A pantograph arrangement may be substituted for pivoted arms 32 and 32' to maintain knife bars 26 and 26' parallel at all values of separation therebetween.

Cutting knife assembly 12 is seen to have its axis rotated approximately 45 degrees with respect to the axis of cutting knife assembly 12, and have its knife bars 26" and 26"' disposed directly above knife bars 26 and 26' of cutting knife assembly 14.

Two additional cutting knife assemblies (not shown) are preferably included in the apparatus. A first of the additional cutting knife assemblies should have its axis rotated an additional 45 degrees from that of cutting knife assembly 12. This places its axis 90 degrees from the axis of cutting knife assembly 10. The other of the additional cutting knife assemblies should have its axis rotated an additional 45 degrees from that of cutting knife assembly 12. This places its axis 90 degrees from the axis of cutting knife assembly 10. The other of the additional cutting knife assemblies should have its axis rotated 90 degrees from that of cutting knife assembly 12 (135 degrees from cutting knife assembly 10).

A pusher assembly 58, may be employed to push a vegetable or other object, such as a carrot 60 through the sets of cutting knife assemblies. Carrot 60 may be suitable prepared by cutting off the top and bottom thereof in a conventional manner before peeling.

Pusher assembly 58 may use any suitable technology capable of providing the required motion, but preferably employs a pneumatic or hydraulic cylinder 62 which is operative to expel and withdraw a plunger 64 the required distance and at the required speed to propel carrot 60 completely through the four cutting knife assemblies at production speeds.

Although not shown in FIG. 1, plunger 64 may have a plurality of tines on the outer extremity thereof for piercing carrot 60 to secure it thereto and to prevent carrot 60 from rotating as it passes through the four cutting knife assemblies.

In operation, a carrot 60 or other suitable object to be peels is pushed end first by plunger 64 toward the uppermost cutting knife assembly 12. Before the arrival of carrot 60, guide plates 18" and 18"', as well as knife bars 26" and 26"' are closer together than the diameter of carrot 60. Carrot 60 pushes against the angled portions of guided plates 18" and 18"' to thereby increase the opening between knife bars 26" and 26"' to a value which just permits carrot 60 to pass therebetween. Upper abutments 52" and 52"' (FIG. 2) prevent excessive rotation of knife members 14" and 14"'. As carrot 60 is forced into contact with the cutting edge of knife bars 26" and 26"', thin peel slices 66 and 68 are removed from opposite sides of carrot 60. Knife members 14" and 14"' pivot about their respective pivot pins (not shown) as required to conform to the angle of carrot 60 and to local surface irregularities thereon.

A similar peeling operation takes place in passage of carrot 60 through the remaining three cutting knife assemblies including cutting knife assembly 10. A completely peeled carrot 60 is seen below cutting knife assembly 10. The completely peeled carrot has eight flat sides corresponding to the eight knife bars which have removed strips of peel therefrom.

Having described a specific embodiment of the invention with reference to the accompanying drawings, it is to be understood that the invention is not limited to this precise embodiment, and that various changes and modifications may be effected therein by one skilled in the art without departing from the scope or spirit of the invention as defined in the appended claims. For example, more or less than the preferred four cutting knife assemblies may be employed for removing pairs of peel slices. Two cutting knife assemblies appears to be a minimum. Furthermore, instead of having two opposed knife bars, each cutting knife assembly may have three or more knife bars without departing from the invention. Auxiliary apparatus, such as guides and water spray devices may also be employed.

What is claimed is:

1. A vegetable peeling apparatus for peeling generally cylindrical vegetables comprising:
    at least first and second pairs of parallel knife members:
    resilient means for urging the knife members of each pair of knife members toward each other to position spaced apart by a distance of less than a diameter of said vegetable;
    guide means on the upstream side of each of said knife members, said guide means having outwardly flaring parts effective to guide said vegetable between sair pair of knife members;
    means for pushing a vegetable to be peeled completely between all of said pairs of parallel knife members, said guide means being effective for moving said parallel knife members of each pair of knife members apart a distance sufficient to accommodate the vegetable therebetween;
    means on each knife member for slicing a strip of peel from the vegetable as it is forced therepast whereby said first and second strips of peel are sliced from opposed sides of the vegetable; and
    said at least first and second pairs of parallel knife members being angularly offset from each other so that each pair of knife members slices first and second strips of peel from different surface portions of the vegetable.

2. A device as claimed in claim 1 wherein said at least first and second pairs of parallel knife members further include third and fourth pairs of parallel knife members and the angular offset of each of said first, second, third and fourth pairs is 45 degrees from the next adjacent pair whereby eight angularly equally spaced strips of peel are sliced from around the entire circumference of the vegetable.

3. A device as claimed in claim 1 wherein each of said guide means is a guide plate, each of said knife members includes a knife bar, means for supporting said knife bar spaced in the direction of travel of the vegetable from said guide plate, a pivoted arm, means for pivoting said guide plate and knife bar to said pivoted arm on an axis parallel to said knife bar.

4. A device as claimed in claim 3 wherein said resilient means for urging includes a resilient member between said pivoted arms of the knife members of each parallel pair, said resilient member being effective to urge said pivoted arms toward each other.

5. A device as claimed in claim 3 wherein each of said knife members includes a stop means affixed to said pivoted arm for limiting angular pivoting of said guide plate and knife bar about said axis.

6. A device as claimed in claim 1 wherein said means for pushing includes a cylinder and a plunger, said plunger being movable under fluid pressure.

7. A device as claimed in claim 1 whrein each of said knife members includes means for permitting pivoting of said knife member about an axis parallel to said means for slicing.

8. A vegetable peeling apparatus for peeling generally cylindrical vegetables comprising:
    at least first and second cutting knife assemblies:
    each of said cutting knife assemblies including first and second opposed knife members;

said first knife member having a first guide plate having a first angled entry portion and a first knife bar supported spaced from said first guide plate;

said second knife member having a second guide plate having a second angled entry portion and a second knife bar supported spaced from said second guide plate;

resilient means for urging said first and second knife members toward each other to positions spaced apart by a distance of less than a diameter of said vegetable;

said first and second knife bars being substantially parallel;

said first and second angled entry portions being flared outward to permit forcing a vegetable therebetween against the urging of said resilient means and effective for forcing said knife members apart a distance sufficient to accommodate the vegetable;

means for pushing the vegetable completely through all of said at least first and second cutting knife assemblies, each of said first and second knife members being effective to slice a strip of peel from said vegetable as it is forced therepast;

said first and second knife bars of said first cutting knife assembly being angularly disposed with respect to said first and second knife bars of said second cutting knife assembly to slice two different strips of peel from said vegetable; and means on each of said knife members for permitting pivoting of said knife member a limited angular extent about an axis parallel to said knife bar whereby surface irregularities in the vegetable are accommodated.

9. A device as claimed in claim 8 wherein said limited angular extent is between 15 and 25 degrees.

10. A vegetable peeling apparatus for peeling generally cylindrical vegetables comprising:

at least first and second cutting knife assemblies;

each of said at least first and second cutting knife assemblies having at least first and second knife members equally angularly spaced about an axis;

means for urging the knife members of each cutting knife assembly toward said axis to a position spaced apart by a distance of less than a diameter of said vegetable;

means for pushing a vegetable to be peeled along said axis successively completely between said knife members of all of said first and second cutting knife assemblies;

guide means at the upstream side of said knife members responsive to the pushing of the vegetable between said knife members for moving said knife members away from said axis to accommodate the vegetable therebetween;

means on each knife member for slicing a strip of peel from the vegetable as it is forced therepast, whereby at least first and second strips of peel are sliced from said vegetable at equally angularly spaced locations; and said at least first and second knife member of said first cutting knife assembly and said at least first and second knife members of said second cutting knife assembly being angularly offset from each other so that each knife member slices a strip of peel from a different surface portion of the vegetable.

11. A device as claimed in claim 1 wherein said at least first and second knife members in each of said cutting knife assembly includes only first and second knife members angularly spaced 180 degrees apart about said axis.

* * * * *